United States Patent [19]

Slutzkin et al.

[11] Patent Number: 5,222,693

[45] Date of Patent: Jun. 29, 1993

[54] APPARATUS FOR SEPARATING PARTICULATE MATTER FROM A FLUID FLOW

[75] Inventors: Samuel Slutzkin, Bat Yam; Dan Rosu, Kfar Saba, both of Israel

[73] Assignee: Israel Aircraft Industries, Ltd., Lod, Israel

[21] Appl. No.: 816,275

[22] Filed: Jan. 3, 1992

[30] Foreign Application Priority Data

Jan. 6, 1991 [IL] Israel ........................................ 96886

[51] Int. Cl.$^5$ .............................................. B64D 33/08
[52] U.S. Cl. ................................ 244/53 B; 60/39.092; 55/467; 209/139.2
[58] Field of Search .................... 244/53 B; 60/39.092; 415/121.2; 55/467, 437; 406/168, 175; 209/139.2, 134, 199

[56] References Cited

U.S. PATENT DOCUMENTS

| | | | |
|---|---|---|---|
| 2,632,626 | 3/1953 | McClintock | 60/39.092 |
| 4,095,966 | 6/1978 | Isley | 55/467 |
| 4,798,047 | 1/1989 | Geary | 60/39.092 |
| 5,152,134 | 10/1992 | Boyd et al. | 60/39.092 |

OTHER PUBLICATIONS

Z. J. Przedpelsky, The T700-GE-700 Engine Experience in Sand Environment, Jour. of Amer. Helic. Soc., vol. 29, No. 4, Oct. 1984, pp. 63-69.

Primary Examiner—Joseph F. Peters, Jr.
Assistant Examiner—Anne E. Bidwell
Attorney, Agent, or Firm—Ladas & Parry

[57] ABSTRACT

Apparatus for separating relatively more dense particulate matter from a relatively less dense fluid flow comprising a separator member mounted for rotation about an axis, and including the following: one or more fluid inlets; one or more particulate matter outlets communicating with an associated fluid inlet and spaced from the axis by a first radius; and one or more fluid outlets, each communicating with an associated fluid inlet and an associated particulate matter outlet and located downstream thereof, each fluid outlet having an opening considerably larger than that of the particulate matter outlet associated therewith and being spaced from the axis by a second radius smaller than the first radius. The apparatus for separating also includes apparatus for rotating the separator member about the axis so as to subject the relatively more dense particulate matter entering through each fluid inlet to a relatively large centrifugal force, thereby causing the particulate matter to travel towards and through an associated particulate matter outlet spaced by the first radius from the axis; the apparatus for rotating also being operative to subject the relatively less dense fluid to a relatively small centrifugal force, thereby causing a major portion of the fluid flow to exit through the fluid outlet associated with and located downstream of the particulate matter outlet.

20 Claims, 3 Drawing Sheets

APPARATUS FOR SEPARATING PARTICULATE MATTER FROM A FLUID FLOW

FIELD OF THE INVENTION

The present invention relates generally to apparatus for decontaminating fluid flows and, more particularly, to apparatus for separating fine particulate matter from air used for cooling turbine blades of gas turbine engines.

BACKGROUND OF THE INVENTION

Among conventional gas turbine engines, there exist both the type that requires cooling by the circulation of relatively cool atmospheric air, and the type which requires no such cooling. Of the air-cooled type relatively cool air drawn from the main air stream of the engine is circulated past a forward air seal mounted onto a first stage turbine disk. The air is then provided to a cooling system built-in to turbine blades mounted onto the turbine disks, and which serves to cool the turbine blades prior to exiting into the exhaust gas flow of the engine.

Typically, the cooling system comprises a plurality of small bore cooling ducts formed in the turbine blades, which permit passage of the air therethrough. Due to the small diameter of the cooling ducts they are prone to becoming clogged in a dusty or sandy environment unless the dust and sand is removed from the air flow prior to its reaching the cooling system. The clogging of the turbine blade cooling system in this way can significantly reduce the operational life of the engine.

Conventional sand separators may be divided into main categories, namely, external and internal separators, both of which are used, for example, with the General Electric T700 engine. A full description thereof may be found in a report entitled "The T700-GE-700 Engine Experience in Sand Environment", presented by Z. J. Przedpelski at the Rotary Wing Propulsion System Specialist Meeting, Williamsburg, Va., U.S.A., Nov. 16-18 1982, and published in the Journal Of American Helicopter Society, Vol. 29, No. 4, Oct. 1984, pp. 63-69.

External sand separators are typically provided so as to reduce the erosion by sand particles of compressor and turbine blades in the engine. These separators include a blower for drawing sand particles from the air intake and for expelling them out into the atmosphere, such that the remaining air, which is subsequently provided to the engine, is generally free of sand particles. Such systems do not, however, prevent the entry of the very fine sand and dust particles from entering the engine and blocking the very narrow cooling air ducts in the turbine blades.

An internal separator, also used with the T700 engine, is located within the engine, downstream of the engine compressor. A portion of the air leaving the compressor flows to the combustion chamber, while a further portion is directed towards the turbines so as to cool them. The engine is configured such that centrifugal forces acting on the sand particles cause them to be driven into the air intake of the combustion chamber, leaving that portion of the air flow to be directed to the turbine blades, with a reduced sand content.

It has been found, however, that the particle removal capability of these systems is only partial, and that even when they are used, blockage of the turbine blade cooling ducts may occur, nonetheless, after a relatively short time. Additionally, the removed particles are allowed to accumulate within the engine, thus requiring its periodic stripping down so as to allow removal of the accumulated material.

SUMMARY OF THE INVENTION

The present invention aims to provide an efficient system for separating particulate matter from a fluid flow.

A further aim of the present invention is to provide a system for separating particulate matter from air used for cooling the turbine blades of a gas turbine engine, so as to prevent blockage of the cooling system thereof, thereby overcoming disadvantages of known art.

An additional aim of the present invention is to provide a particulate matter separator which is mounted onto the first stage turbine disk so as to rotate therewith, the structure of the separator being such that particles in the air flowing therepast are thrust outwardly therefrom into the exhaust gas flow so as to be released into the atmosphere together with the exhaust gases downstream of the turbine blades.

There is thus provided, in accordance with an embodiment of the present invention, apparatus for separating relatively more dense particulate matter from a relatively less dense fluid flow comprising a separator member mounted for rotation about an axis, and including the following: one or more fluid inlets; one or more particulate matter outlets communicating with an associated fluid inlet and spaced from the axis by a first radius; and one or more fluid outlets, each communicating with an associated fluid inlet and an associated particulate matter outlet and located downstream thereof, each fluid outlet having an opening considerably larger than that of the particulate matter outlet associated therewith and being spaced from the axis by a second radius smaller than the first radius. The apparatus for separating also includes apparatus for rotating the separator member about the axis so as to subject the relatively more dense particulate matter entering through each fluid inlet to a relatively large centrifugal force, thereby causing the particulate matter to travel towards and through an associated particulate matter outlet spaced by the first radius from the axis; the apparatus for rotating also being operative to subject the relatively less dense fluid to a relatively small centrifugal force, thereby causing a major portion of the fluid flow to exit through the fluid outlet associated with and located downstream of the particulate matter outlet.

Additionally in accordance with an embodiment of the invention, the separator member also includes labyrinth apparatus operative to permit fluid communication between each fluid inlet and the particulate matter outlet and the fluid outlet associated therewith. The labyrinth apparatus is configured to apply a predetermined bend, preferably of about 180° to the fluid flow therethrough.

According to an alternative embodiment of the invention, the separator member is mounted onto the turbine disk of a gas turbine engine, such as may be used in an aircraft, and is operative to separate sand and dust particles from an atmospheric air flow used for cooling the turbine blades of the engine, thereby enabling the provision to the turbine blades of a cooling airflow that is substantially uncontaminated by sand or dust and which will, therefore, not cause clogging of the narrow cooling ducts formed within the turbine blades.

BRIEF DESCRIPTION OF THE DRAWINGS

The present invention will be more fully understood and appreciated from the following detailed description, taken in conjunction with the drawings, in which.

DETAILED DESCRIPTION OF A PREFERRED EMBODIMENT

Figure 2:
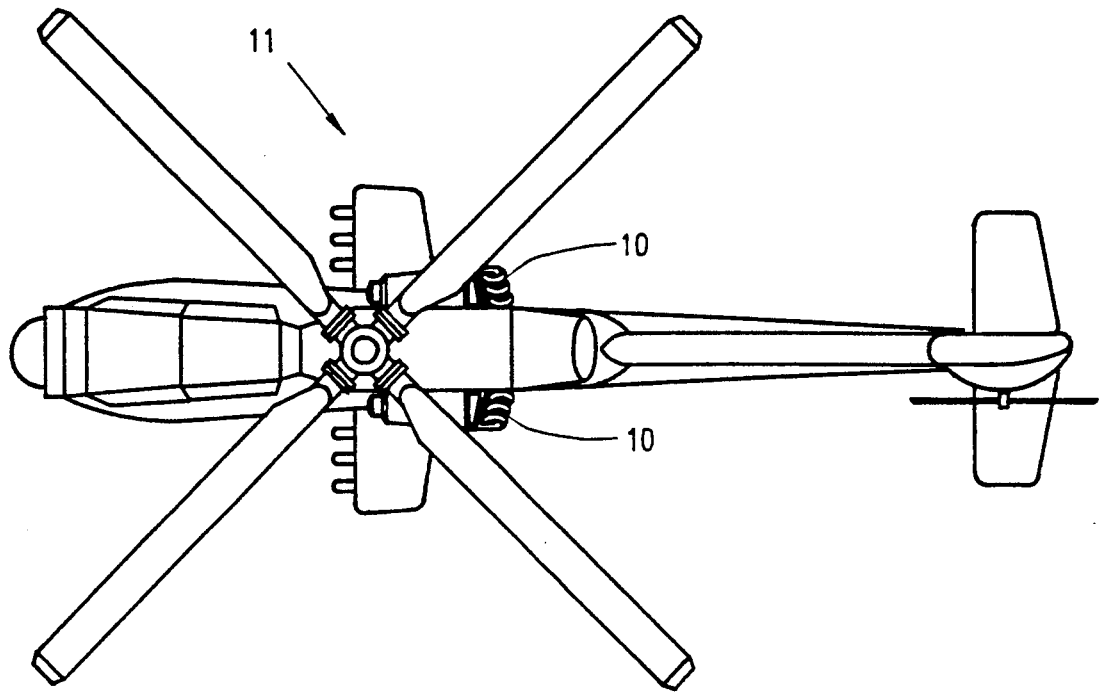
FIG. 2 is a schematic plan view illustration of an aircraft powered by a pair of gas turbine engines employing the particle separator of the present invention.
Figure 1:
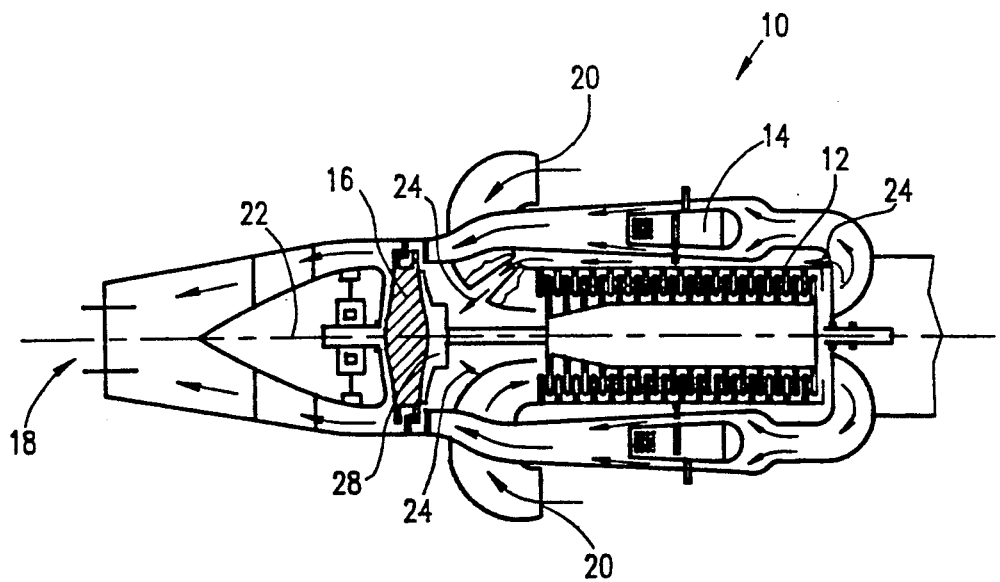
FIG. 1 is a schematic cross-sectional illustration of a gas turbine engine including a particle separator constructed according to the present invention.

Reference is made to FIG. 1, in which is illustrated a gas turbine engine, referenced generally 10, typically a turboprop or a turboshaft engine, such as may be employed in an aircraft such as a helicopter, shown generally at 11 in FIG. 2. The engine 10 includes a compressor 12, a combustion chamber 14, a turbine 16 and an outlet 18 for exhaust gases. Air is drawn into the engine at inlets 20 and is supplied, via compressor 12, to combustion chamber 14. Exhaust gases leaving the combustion chamber 14 under high pressure drive turbine 16 about an axis 22, the gases subsequently leaving the engine through exhaust outlet 18. A portion of the air exiting compressor 12 is supplied to turbine 16 for cooling the turbine blades, of which one, reference 26, is illustrated schematically in FIG. 3. The flow of air from compressor 12 to turbine 16 is indicated by arrows 24.

As described in the background of the invention, if the engine is used in a dusty and/or sandy environment, the air drawing into the engine is contaminated by a large amount of particulate matter, and the cooling system of the turbine blades may thus become clogged after a relatively short flying time.

Figure 3:
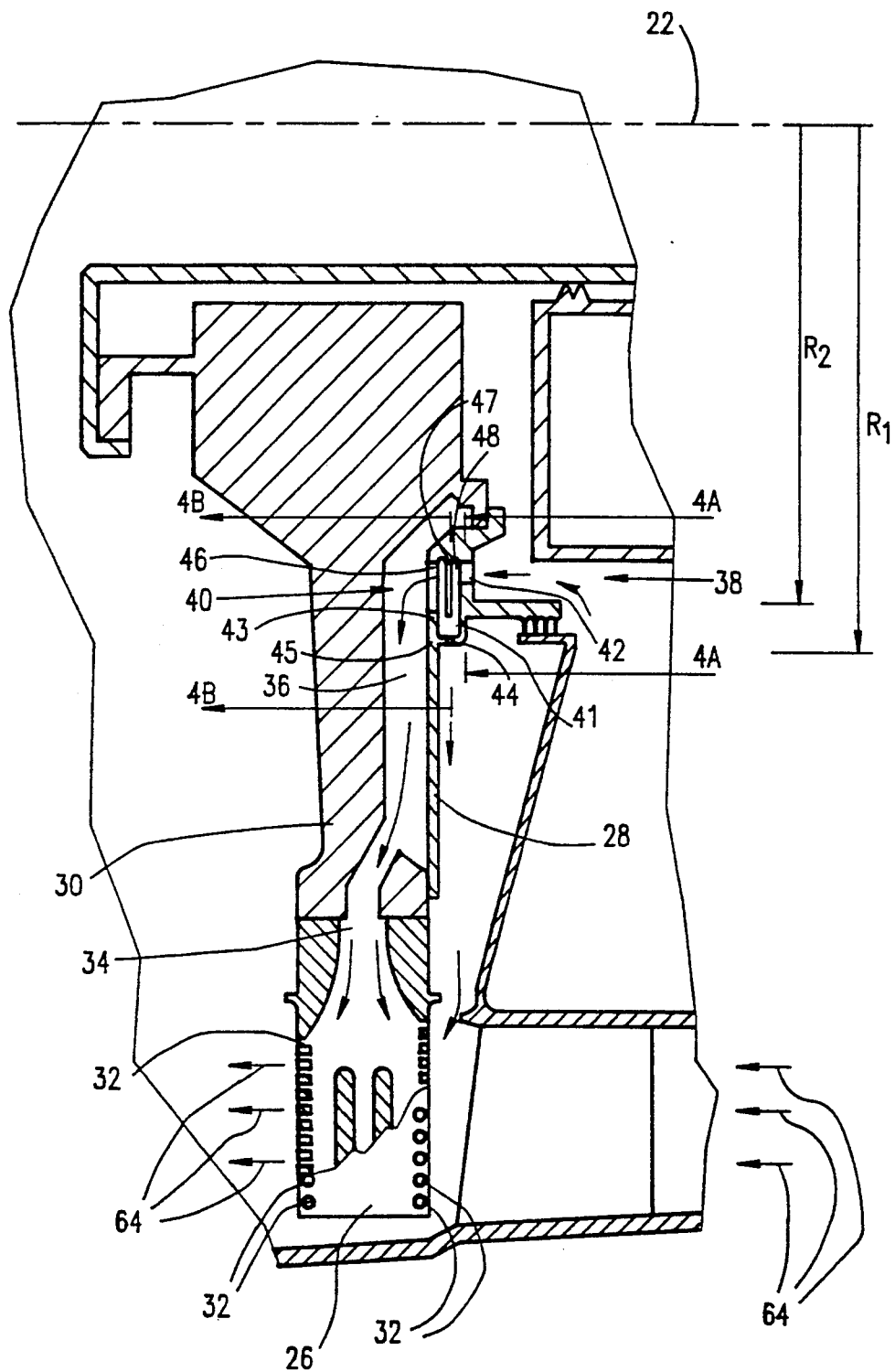
FIG. 3 is a sectional view of a portion of a gas turbine engine, such as shown in FIG. 1, employing a particle separator constructed according to the present invention.
Figure 4B:
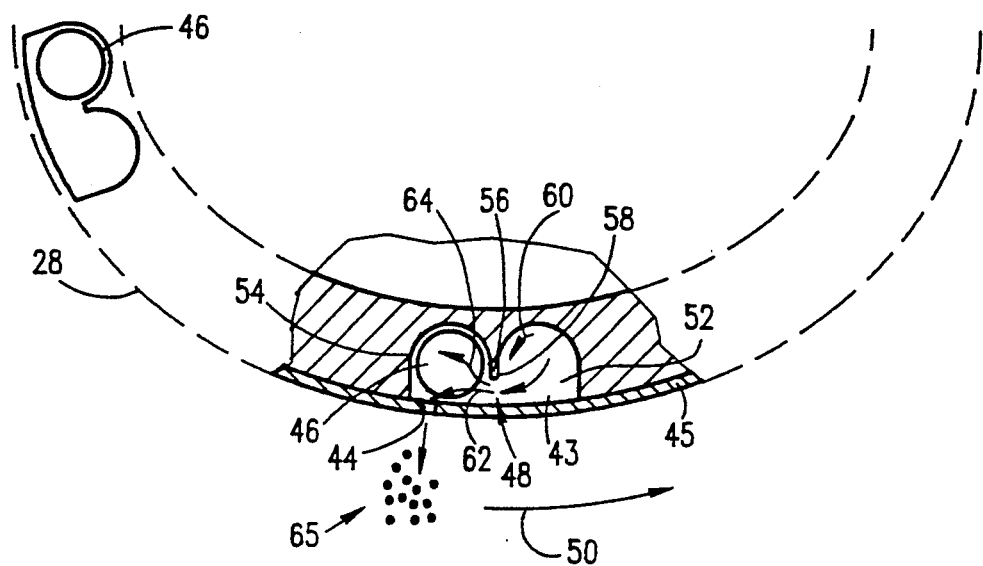
FIGS. 4A ad 4B are sectional illustrations of the particle separator of FIG. 3, taken along respective lines 4A—4A and 4B—4B therein.

The present invention provides a particle separator 28 which, as described below in conjunction with FIGS. 3-4B, is mounted onto the turbine 16 so as to separate particles of sand and dust from the cooling air intake, thereby preventing clogging of the turbine blade cooling system.

Referring now to FIG. 3, turbine 16 includes a first stage turbine disk 30 onto which are mounted a plurality of first stage turbine blades 26. A single, exemplary blade 26 is illustrated in partial section in FIG. 3. Particle separator 28 of the present invention is secured to an upstream face of turbine disk 30 by any suitable means (not shown), so as to be rotatable therewith.

In the present example, turbine blade 26 has a cooling system having a plurality of small bore ducts 32. Cooling air is supplied to ducts 32 via particle separator 28, a cooling air inlet 34, and a space 36 between particle separator 28 and disk 30.

It will be appreciated, however, that the precise cooling system illustrated herein is for example only. Furthermore, although the particle separator 28 of the present invention is described, for example, in use with a helicopter engine turbine, particle separator 28 may alternatively be used in conjunction with substantially any rotating turbine or other rotating body through which a fluid, typically a gas, flows, for the purpose of separating particle contaminants from the flow.

Figure 4A:
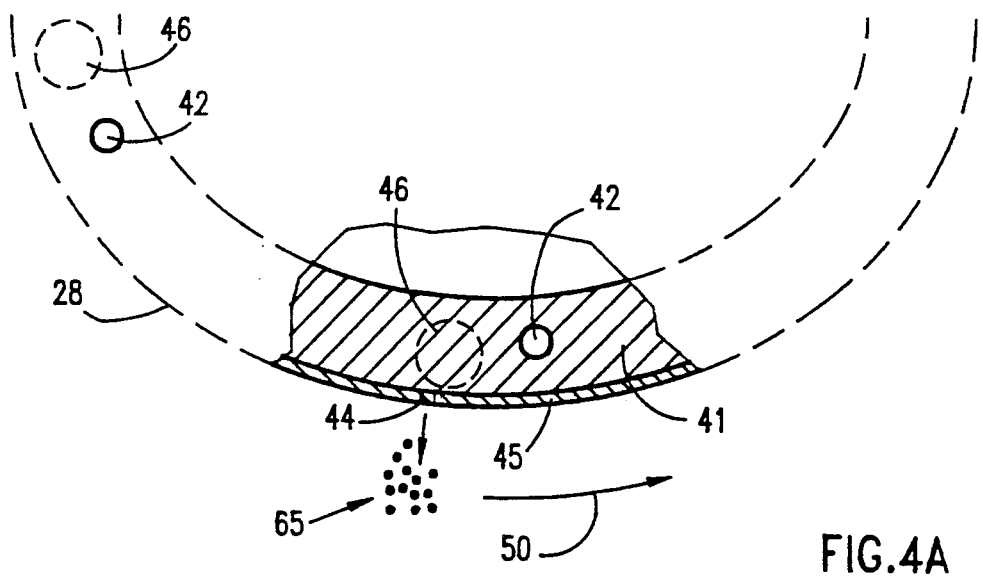

Reference is now made additionally to FIGS. 4A and 4B, which are sectional illustrations of a portion of the particle separator 28 taken along respective cut lines 4A—4A and 4B—4B in FIG. 3. Particle separator 28 comprises a ring-like member (of which only a portion is indicated in FIGS. 4A and 4B) having respective upstream and downstream sides, referenced generally 38 and 40 (FIG. 3).

Particle separator 28 includes front and back portions, respectively referenced 41 and 43 which are connected by a generally annular rim portion 45, and an interior ring member 47. Formed in front portion 41 are a plurality of contaminated air inlets 42 (FIGS. 3 and 4A). Each contaminated air inlet 42 communicates with a particle outlet 44, formed in rim member 45, and a decontaminated air outlet 46, formed in back portion 43, via a labyrinth 48 (FIGS. 3 and 4B).

Particle outlet 44, being formed in rim portion 45, is spaced from rotation axis 22 by a first radius $R_1$ (FIG. 3), while decontaminated air outlet 46 is spaced from rotation axis 22 by a second radius $R_2$ (FIG. 3) smaller than radius $R_1$. Furthermore, particle outlet 44 defines an opening significantly smaller than the opening of the air outlet 46. Typically, the decontaminated air outlet 46 defines an opening whose area is at least 100 or more times the size of the opening defined by particle outlet 44.

As described hereinabove, particle separator 28 is secured to turbine disk 30 so as to be rotated therewith about axis 22. This rotation occurs typically at a rate in the range 9,000 to 55,000 rpm, and is indicated by arrow 50 in FIGS. 4A and 4B as being in an anti-clockwise direction.

As turbine disk 30 and particle separator 28 rotate, air contaminated with sand and/or dust particles and flowing from compressor 12 to turbine 16, as indicated by arrows 24 (FIG. 1), enters contaminated air inlet 42 and is subjected to a large centrifugal force caused by the high speed of rotation of the turbine and the separator.

Both the solid particles and the air contained in the contaminated air flow are subjected to centrifugal forces. The solid particles, however, having a much greater density than the air, experience a centrifugal force that is much greater than that experienced by the air. Accordingly, the solid particles contained in the air flow ar thrust outward under a much greater centrifugal force than the air, and so are forced through the relatively narrow opening defined by the peripherally located particle outlet 44, spaced, as described, by radius $R_1$ from axis 22. Due to the narrowness of the particle outlet 44, the vast majority of the air is forced t flow downstream of the particle outlet 44 and towards and through the much larger opening defined by the decontaminated air outlet 46, from where it is circulated to the cooling system of the turbine blades 26 (FIG. 3).

Accordingly, when engine 10 (FIGS. 1 and 2) is operated, thereby causing high speed rotation of both the turbine 16 (FIG. 2) and, consequently, separator 28, particles contained in the air flow entering through inlet 42 are thrust in a generally radially-direction towards rim portion 45, and, at the same time, in a direction opposite to the direction of rotation of the separator, eventually exiting through particle outlet 44. They are subsequently taken up in the exhaust gases flow downstream of turbine blades 26. The exhaust gas flow is indicated schematically in FIG. 3 by arrows 64.

So as to further enhance the separation of contaminant particles from the air flow, labyrinth structure 48, illustrated in FIG. 4B is provided. In the illustrated example, the labyrinth is defined by respective first and second, symmetrically arranged, generally J-shaped recesses 52 and 54, formed in interior ring member 47. The two recesses are connected by a radially extending baffle 56 tapering towards a free end 58 spaced from rim portion 45.

As separator 28 is rotated, air entering the labyrinth 48 via contaminated air inlet 42 flows around baffle 56 and out through decontaminated air outlet 46, formed in the back portion 43 (FIG. 3) of the separator. It will be appreciated that the presence of the baffle serves to direct the incoming contaminated air is directed towards the rim portion 45, as indicated by arrow 60 (FIG. 4B). The bend in the air flowing around the baffle 56 ensured that no stray particles exit through the decontaminated air outlet 44. In the present example, the bend is 180°, although the baffle may alternatively be configured to provide a bend of any other suitable angle.

While the major portion of the air flow exits downstream of baffle 56, the particles are thrust outwards towards rim portion 45 and continue moving in a direction opposite to the direction of rotation of separator 28 until reaching and exiting through particle outlet 44. The path of the particulate matter after having been separated from the incoming air flow is shown by arrows 62 and 65 (FIG. 4B), while the path of the decontaminated air flow is shown by arrow 64 (FIG. 4B).

It will be appreciated by persons skilled in the art that, the scope of the present invention is not limited to what has been shown and described hereinabove. The scope of the invention is limited, rather, solely by the claims, which follow.

We claim:

1. Apparatus for separating relatively more dense particulate matter from a relatively less dense fluid flow comprising:
    separator means mounted for rotation about an axis, and comprising:
        at least one fluid inlet;
        at least one particulate matter outlet defining an opening of a first area, communicating with said at least one fluid inlet and spaced from said axis by a first radius; and
        at least one fluid outlet communicating with said at least one fluid inlet and said at least one particulate matter outlet and located downstream thereof, said at least one fluid outlet defining an opening of a second area larger than said first area, and being spaced from said axis by a second radius smaller than said first radius; and
    means for rotating said separator means about said axis so as to subject the relatively more dense particulate matter entering through said at least one fluid inlet to a relatively large centrifugal force, thereby causing the particulate matter to travel towards and through said at least one particulate matter outlet spaced by said first radius from said axis, said means for rotating also being operative to subject the relatively less dense fluid to a relatively small centrifugal force, thereby causing a major portion of the fluid flow to exit through said at least one fluid outlet located downstream of said at least one particulate matter outlet.

2. Apparatus according to claim 1, and wherein said separator means also includes labyrinth means operative to permit fluid communication between said at least one fluid inlet, said at least one particulate matter outlet, and said at least one fluid outlet.

3. Apparatus according to claim 2, and wherein said labyrinth means is configured to apply a predetermined bend to the fluid flow therethrough between said at least one fluid inlet and said at least one fluid outlet.

4. Apparatus according to claim 3, and wherein said labyrinth means defines radially-arranged baffle means formed between said at least one fluid and said at least one fluid outlet so as to apply a 180° bend to the fluid flow therethrough.

5. Apparatus according to claim 1, and wherein said separator means has a generally circular configuration and is mounted symmetrically with respect to said rotation axis.

6. Apparatus for separating relatively more dense particulate matter from a relatively less dense contaminated fluid flow so as to provide a decontaminated fluid flow for cooling the turbine blades of a gas turbine engine having a turbine disk and a plurality of turbine blades mounted thereon for rotation therewith about a rotation axis, wherein each turbine blade defines a plurality of small bore cooling ducts configured to permit the flow of fluid therethrough, said apparatus for separating being mounted onto the turbine disk for rotation about said rotation axis, and comprising:
    at least one contaminated fluid inlet,
    at least one particulate matter outlet defining an opening of a first area, communicating with said at least one contaminated fluid inlet and spaced from said axis by a first radius; and
    at least one decontaminated fluid outlet communicating with said at least one contaminated fluid inlet and said at least one particulate matter outlet and located downstream thereof, said at least one decontaminated fluid outlet defining an opening of a second area larger than said first area, and being spaced from said axis a second radius smaller than said first radius;
    operation of the gas turbine engine so as to rotate the turbine disk and said apparatus for separating causing the contaminated fluid flow to enter through said at least one contaminated fluid inlet, and being operative to subject the relatively more dense particulate matter entering through said at least one contaminated fluid inlet to a relatively large centrifugal force, thereby causing the particulate matter to travel towards and through said at least one particulate matter outlet spaced by said first radius from said axis, said means for rotating also being operative to subject the relatively less dense fluid to a relatively small centrifugal force, thereby causing a major portion of the fluid flow to exit through said at least one decontaminated fluid outlet located downstream of said at least one particulate matter outlet.

7. Apparatus according to claim 6, and wherein said apparatus for separating also includes labyrinth means operative to permit fluid communication between said at least one contaminated fluid inlet, said at least one particulate matter outlet, and said at least one decontaminated fluid outlet.

8. Apparatus according to claim 7, and wherein said labyrinth means is configured to apply a predetermined bend to the fluid flow therethrough between said at least one contaminated fluid inlet and said at least one decontaminated fluid outlet.

9. Apparatus according to claim 8, and wherein said labyrinth means defines radially-arranged baffle means formed between said at least one contaminated fluid inlet and said at least one decontaminated fluid outlet so as to apply a 180° bend to the fluid flow therethrough.

10. Apparatus according to claim 6, and wherein said apparatus for separating has a generally circular configuration and is mounted symmetrically with respect to said rotation axis.

11. A gas turbine engine comprising:
air compression means having an air inlet and a compressed air outlet;
combustion chamber means located downstream of said compressed air outlet and having an inlet for said compressed air and an outlet for exhaust gases;
at least a first stage turbine disk located downstream of said combustion means and rotatable about a rotation axis;
a plurality of turbine blades mounted onto said first stage turbine disk thereon for rotation therewith, each turbine blade defining a plurality of small bore cooling ducts;
means for cooling said turbine blades by provision thereto of a relatively cool, relatively less dense fluid flow contaminated with relatively more dense particulate matter; and
apparatus for separating particulate matter from the fluid flow used for cooling said turbine blades, said apparatus for separating being mounted onto said first stage turbine disk for rotation about said rotation axis, and comprising:
at least one contaminated fluid inlet,
at least one particulate matter outlet defining an opening of a first area, communicating with said at least one contaminated fluid inlet and spaced from said axis by a first radius; and
at least one decontaminated fluid outlet communicating with said at least one contaminated fluid inlet and said at least one particulate matter outlet and located downstream thereof, said at least one decontaminated fluid outlet defining an opening of a second area larger than said first area, and being spaced from said axis a second radius smaller than said first radius;
operation of said gas turbine engine so as to rotate the turbine disk and said apparatus for separating causing the contaminated fluid flow to enter through said at lest one contaminated fluid inlet, and being operative to subject the relatively more dense particulate matter entering through said at least one contaminated fluid inlet to a relatively large centrifugal force, thereby causing the particulate matter to travel towards and through said at least one particulate matter outlet spaced by said first radius from said axis, said means for rotating also being operative to subject the relatively less dense fluid to a relatively small centrifugal force, thereby causing a major portion of the fluid flow to exit through said at least one decontaminated fluid outlet located downstream of said at least one particulate matter outlet.

12. A gas turbine engine according to claim 11, and wherein said apparatus for separating also includes labyrinth means operative to permit fluid communication between said at least one contaminated fluid inlet, said at least one particulate matter outlet, and said at least one decontaminated fluid outlet.

13. A gas turbine engine according to claim 12, and wherein said labyrinth means is configured to apply to predetermined bend to the fluid flow therethrough between said at least one contaminated fluid inlet and said at least one contaminated fluid inlet and said at least one decontaminated fluid outlet.

14. A gas turbine engine according to claim 13, and wherein said labyrinth means defines radially-arranged baffle means formed between said at least one contaminated fluid inlet and said at least one decontaminated fluid outlet so as to apply a 180° bend to the fluid flow therethrough.

15. A gas turbine engine according to claim 11, and wherein said apparatus for separating has a generally circular configuration and is mounted symmetrically with respect to said rotation axis.

16. An aircraft comprising:
an aircraft body, and
gas turbine engine apparatus for powering said aircraft body, and comprising:
air compression means having an air inlet and a compressed air outlet;
combustion chamber means located downstream of said compressed air outlet and having an inlet for said compressed air and an outlet for exhaust gases;
at least a first stage turbine disk located downstream of said combustion means and rotatable about a rotation axis;
a plurality of turbine blades mounted onto said first stage turbine disk thereon for rotation therewith, each turbine blade defining a plurality of small bore cooling ducts;
means for cooling said turbine blades by provision thereto of a relatively cool, relatively less dense fluid flow contaminated with relatively more dense particulate matter; and
apparatus for separating particulate matter from the fluid flow used for cooling said turbine blades, said apparatus for separating being mounted onto said first stage turbine disk for rotation about said rotation axis, and comprising:
at least one contaminated fluid inlet,
at least one particulate matter outlet defining an opening of a first area, communicating with said at least one contaminated fluid inlet and spaced from said axis by a first radius; and
at least one decontaminated fluid outlet communicating with said at least one contaminated fluid inlet and said at least one particulate matter outlet and located downstream thereof, said at least one decontaminated fluid outlet defining an opening of a second area larger than said first area, and being spaced from said axis a second radius smaller than said first radius;
operation of said gas turbine engine so as to rotate the turbine disk and said apparatus for separating causing the contaminated fluid flow to enter through said at least one contaminated fluid inlet, and being operative to subject the relatively more dense particulate matter entering through said at least one contaminated fluid inlet to a relatively large centrifugal force, thereby causing the particulate matter to travel towards and through said at least one particulate matter outlet spaced by said first radius from said axis, said means for rotating also being operative to subject the relatively less dense fluid to a relatively small centrifugal force, thereby causing a major portion of the fluid flow to exit through said at least one decontaminated fluid outlet located downstream of said at least one particulate matter outlet.

17. An aircraft according to claim 16, and wherein said apparatus for separating also includes labyrinth means operative to permit fluid communication between said at least one contaminated fluid inlet, said at least one particulate matter outlet, and said at least one decontaminated fluid outlet.

18. An aircraft according to claim 17, and wherein said labyrinth means is configured to apply a predetermined bend to the fluid flow therethrough between said at least one contaminated fluid inlet and said at least one decontaminated fluid outlet.

19. An aircraft according to claim 18, and wherein said labyrinth means defined radially-arranged baffle means formed between said at least one contaminated fluid inlet and said at least one decontaminated fluid outlet so as to apply a 180° bend to the fluid flow therethrough.

20. An aircraft according to claim 16, and wherein said apparatus for separating has a generally circular configuration and is mounted symmetrically with respect to said rotation axis.

* * * * *